United States Patent
Olarig et al.

(10) Patent No.: US 11,210,084 B2
(45) Date of Patent: Dec. 28, 2021

(54) INTEGRATED SINGLE FPGA AND SOLID STATE DISK CONTROLLER

(71) Applicant: Samsung Electronics Co., Ltd., Suwon-si (KR)

(72) Inventors: Sompong Paul Olarig, Pleasanton, CA (US); Ramdas P. Kachare, Cupertino, CA (US); Son Truong Pham, San Ramon, CA (US); Fred Worley, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/127,061

(22) Filed: Sep. 10, 2018

(65) Prior Publication Data

US 2019/0278586 A1    Sep. 12, 2019

Related U.S. Application Data

(60) Provisional application No. 62/641,251, filed on Mar. 9, 2018.

(51) Int. Cl.
   *G06F 9/44*    (2018.01)
   *G06F 8/654*   (2018.01)
(52) U.S. Cl.
   CPC .................................. *G06F 8/654* (2018.02)
(58) Field of Classification Search
   CPC .......... G06F 8/654; G06F 8/65; G06F 21/572; G06F 21/575
   See application file for complete search history.

(56) References Cited

U.S. PATENT DOCUMENTS

| | | | |
|---|---|---|---|
| 7,265,578 B1* | 9/2007 | Tang | G01R 31/318516 326/40 |
| 7,313,730 B1* | 12/2007 | Ryser | G06F 11/2236 714/25 |
| 7,822,958 B1 | 10/2010 | Allen et al. | |
| 2008/0250403 A1* | 10/2008 | Moon | G06F 8/30 717/169 |
| 2009/0313430 A1* | 12/2009 | Jones | G16H 40/63 711/114 |
| 2012/0254636 A1* | 10/2012 | Tsukamoto | G06F 12/0868 713/300 |
| 2014/0201458 A1* | 7/2014 | Fujikami | G06F 11/3409 711/136 |
| 2016/0231804 A1* | 8/2016 | Bulusu | G06F 1/3287 |
| 2017/0357609 A1* | 12/2017 | Long | G06F 13/16 |
| 2018/0039422 A1* | 2/2018 | Li | G06F 3/0608 |
| 2018/0081828 A1 | 3/2018 | Bell | |

OTHER PUBLICATIONS

Bogaard, Martijn, et al., "The Evil SSD Project, when your storage has a mind of its own", University of Amsterdam, Master in System and Network Engineering, May 31, 2015, p. 44.

* cited by examiner

*Primary Examiner* — Ted T. Vo
*Assistant Examiner* — Amir Soltanzadeh
(74) *Attorney, Agent, or Firm* — Lewis Roca Rothgerber Christie LLP

(57) ABSTRACT

A system and method for updating storage system includes a solid state disk (SSD) attached to a FPGA. The solid state disk is configured to receive a firmware image and a firmware upgrade module operating on the FPGA is configured to identify the presence of the firmware image on the SSD. The firmware upgrade module is further configured to store the firmware image in a buffer on the FPGA and write the firmware image.

15 Claims, 6 Drawing Sheets

INTEGRATED SINGLE FPGA AND SOLID STATE DISK CONTROLLER

CROSS-REFERENCE TO RELATED APPLICATION(S)

The present application claims priority to and the benefit of U.S. Provisional Patent Application Ser. No. 62/641,251 filed Mar. 9, 2018 and entitled "INTEGRATED SINGLE FPGA+SSD CONTROLLER," the entire content of which is hereby expressly incorporated by reference.

FIELD

One or more aspects of embodiments according to the present disclosure relates to field programmable gate arrays (FPGAs) and solid state disks (SSDs).

BACKGROUND

Field programmable gate arrays (FPGAs) include a collection of integrated circuits that are designed to be highly configurable by a user. For example, a typical FPGA has a plurality of programmable logic blocks and reconfigurable interconnects. The flexibility of FPGAs has resulted in their use in combination with solid state (SSDs) disks to provide dedicated computational power close to data storage.

Some implementations of FPGAs in conjunction with SSDs (e.g., FPGA SSDs) included an interposer board and a SSD. The interposer board generally included the FPGA, DDR4 memory, SPI NOR flash, a clock generator, and other components, while the SSD generally included a standard non-volatile memory express (NVMe) SSD. Such implementations resulted in a casing having a length that is a few inches longer than a standard drive tray. Thus, the resulting form factor was no longer compliant with the standard 2.5" drive form factor. This oversized form factor resulted in the inability makes these past FPGA SSDs too large for many applications.

Some FPGA SSDs suffer from a plurality of other issues. For example, many FPGA SSD solutions utilized multiple redundant controllers which increase the overall expense. For example, some FPGA SSDs include multiple DRAM and/or NOR controllers. In some examples, the FPGA SSDs are connected as PCIe add-in cards. Connecting FPGA SSDs using PCIe slots is problematic because each server only has room for a few add-in cards. In other examples, some SSD slots (e.g., PCIe or U.2 slots) can usually support up to 25 W of power. This is problematic since many FPGA SSD solutions may consume, for example, 35 W of power. In some examples, some FPGA SSD solutions may consume between 30 W and 40 W of power. Thus, a FPGA SSD solution that consumes less than 25 W per device, fits in a 2.5" standard form factor, and supports both NVMe and NVMe over fabric (NVMe-oF) protocols is desired.

Furthermore, the upgrade process for some FPGA SSDs is typically a time consuming and laborious when compared to traditional SSDs. For example, a user typically has to download SSD firmware using an NVMe specific application. The downloaded firmware is then sent to the SSD via PCIe. Once uploaded to the SSD, the new firmware may be unpacked and installed. Similarly, to upgrade the FPGA's firmware also typically requires utilizing an FPGA application, to download and send the new firmware to the FPGA via PCIe using the FPGA driver. The downloaded firmware may then be unpacked and installed on the FPGA. Thus, a user generally has to do the same task twice, using two separate applications to upgrade the system firmware. A more streamlined upgrading process is also needed.

The above information is only for enhancement of understanding of the background of embodiments of the present disclosure, and therefore may contain information that does not form the prior art.

SUMMARY

Some embodiments of the present disclosure provide a system and method for operating a storage system having an FGPA SSD. In various embodiments, the FPGA SSD includes a storage controller operating on the FPGA.

In various embodiments, the system and method provide for updating the storage system. In various embodiments, the system is configured to receive, at a solid state disk (SSD) attached to a FPGA, a firmware image. A firmware upgrade module operating on the FPGA, is configured to identify the presence of the firmware image on the SSD, store the firmware image in a buffer on the FPGA, and write the firmware image.

In various embodiments, the firmware image includes at least one of a processor firmware image and a register-transfer level (RTL) firmware image.

In various embodiments, the firmware upgrade module is further configured to determine, by the firmware upgrade module operating on the FPGA, that the firmware image comprises the processor firmware image and storing the firmware image comprises storing the processor firmware image in a processor firmware buffer of the FPGA.

In various embodiments, writing, by the firmware upgrade module, the firmware image includes flashing, by the firmware upgrade module, a processor firmware storage with the processor firmware image.

In various embodiments, the processor firmware storage is a NOR flash.

In various embodiments, the firmware upgrade module is configured to determine that the firmware image comprises a register-transfer level (RTL) firmware and store the RTL firmware image in a RTL firmware buffer of the FPGA.

In various embodiments, writing, by the firmware upgrade module, the firmware image includes flashing, by the firmware upgrade module, a programmable logic of the FPGA with the RTL firmware image.

In various embodiments, the FPGA includes a storage controller configured to interface with the SSD.

In various embodiments, writing, by the firmware upgrade module, the firmware image, includes receiving, from a host, a commit command.

In various embodiments, a FPGA solid state disk includes a solid state disk (SSD) configured to receive a firmware image and an FPGA configured to operate a storage controller for the SSD. In various embodiments, the FPGA includes a firmware upgrade module configured to: identify a presence of the firmware image on the SSD; and write the firmware image.

In various embodiments, the firmware upgrade module is further configured to: determine that the firmware image includes a processor firmware image and store the processor firmware image in a processor firmware buffer of the FPGA; determine that the firmware image includes a register-transfer level (RTL) firmware image and store the RTL firmware image in a RTL firmware buffer of the FPGA.

In various embodiments, writing the firmware image includes checking the processor firmware buffer for the processor firmware image and writing the contents of the processor firmware buffer when an updated processor firmware image is present; and checking the RTL firmware buffer for the processor firmware image and writing the contents of the RTL firmware buffer when an updated processor firmware image is present.

In various embodiments writing the contents of the processor firmware buffer includes flashing the processor firmware image to a NOR flash and writing the contents of the RTL firmware buffer includes flashing the RTL firmware to a FPGA programmable logic.

In various embodiments, the firmware upgrade module is further configured to receive a commit command from a host and write the at least one of the processor firmware image or the RTL firmware image according to the commit command.

In various embodiments, the SSD is configured to receive the firmware image directly from a host.

In various embodiments, the method of updating storage system includes: receiving, at a solid state disk attached to a FPGA, a firmware image comprising at least one of a processor firmware image and a register-transfer level (RTL) firmware image; determining, by a firmware upgrade module operating on the FPGA, that the firmware image includes the processor firmware image and storing the processor firmware image in a processor firmware buffer; determining, by the firmware upgrade module operating on the FPGA, that the firmware image includes a register-transfer level (RTL) firmware image and storing the RTL firmware image in a RTL firmware buffer; flashing, by the firmware upgrade module, a processor firmware storage with the processor firmware image; and flashing, by the firmware upgrade module, a programmable logic of the FPGA with the RTL firmware image.

In various embodiments, the method further includes unpacking the firmware image, by the firmware upgrade module operating on the FPGA.

In various embodiments, determining, by the firmware upgrade module operating on the FPGA, when the firmware image comprises the processor firmware image includes examining, by the firmware upgrade module, a header of the unpacked firmware image to determine that the firmware image comprises the processor firmware image.

In various embodiments, determining, by the firmware upgrade module operating on the FPGA, when the firmware image comprises the RTL firmware image includes examining, by the firmware upgrade module, a header of the unpacked firmware image to determine that the firmware image comprises the RTL firmware image.

In various embodiments, the method further includes receiving, from a host, a commit command to flash the firmware image.

BRIEF DESCRIPTION OF THE DRAWINGS

Some embodiments can be understood in more detail from the following description taken in conjunction with the accompanying drawings, in which.

DETAILED DESCRIPTION

Figure 1:
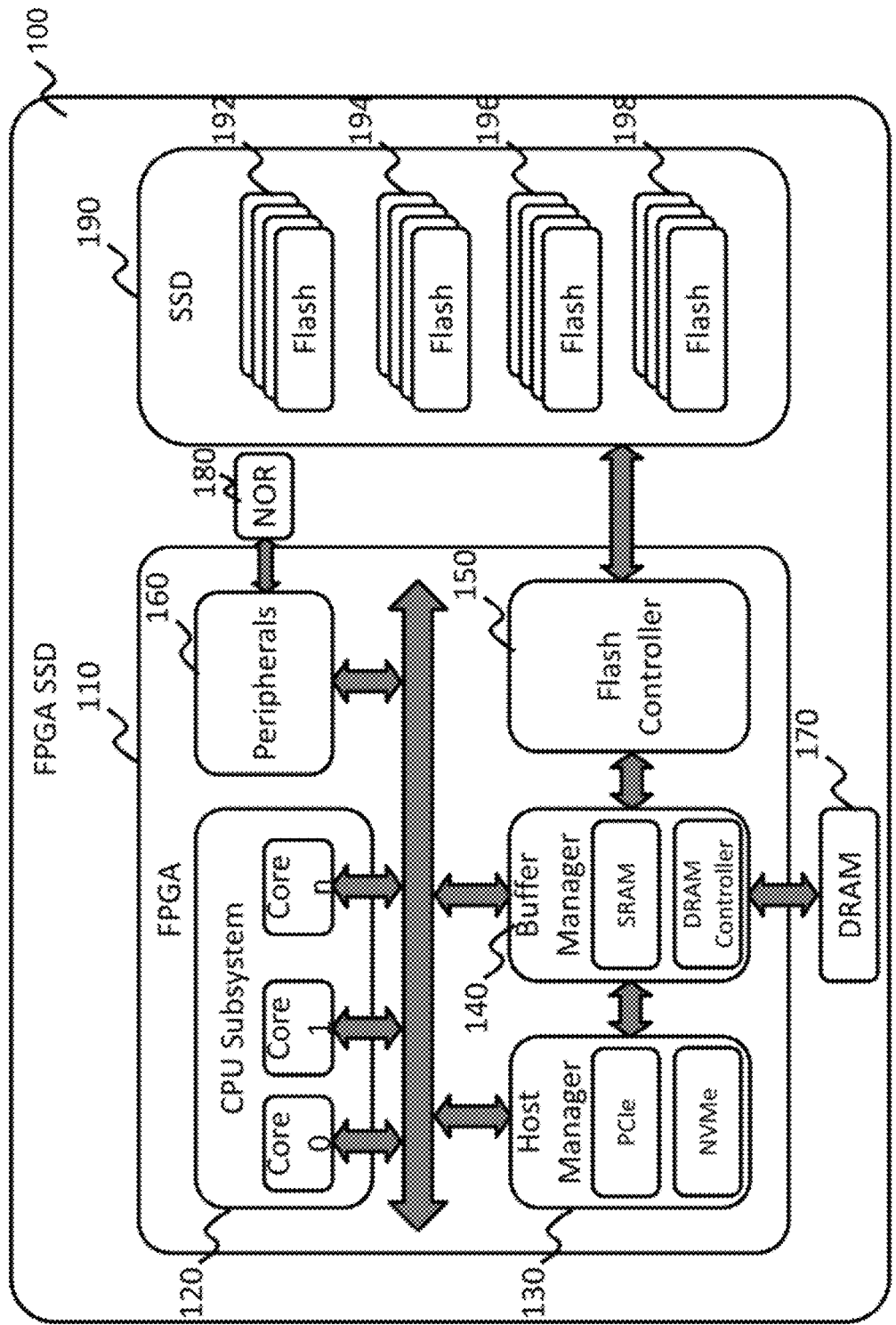
FIG. 1 depicts a block diagram of an example FPGA SSD architecture according to various embodiments.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Embodiments of the present disclosure include a system and method for a field programmable gate array (FPGA) with an integrated solid state disk (SSD) controller. In various embodiments, the system provides for a single controller solution for managing NVMe, Flash, an FPGA, and DDR memory. Thus, the system is capable of reducing size when compared to prior systems while also lowering power consumption and cost per device by combining systems and omitting redundant hardware. For example, embodiments of the present system allow for the use of a single SPI NOR for the FPGA and NVMe SSD and a single DDR memory controller for both the FPGA and the SSD. Furthermore, embodiments of the system allow for the managing the FPGA SSD system allowing for a streamlined firmware updating procedure. For example, the FPGA SSD system may include upgradable firmware for both the processor portion of the FPGA and the storage controller and other portions of the FPGA.

FIG. 1 depicts a block diagram of an example FPGA SSD architecture according to various embodiments.

Referring to FIG. 1, in various embodiments, the FPGA SSD includes various functions operating on FPGA programmable logic. For example, in various embodiments the FPGA SSD 100 includes an FPGA 110 connected to and configured to manage a solid state disk (SSD) 190. For example, in various embodiments, the FPGA 110 includes a CPU subsystem 120, and a host manager 130, a buffer manager 140, a flash controller 150, and peripheral interface 160. In various embodiments, the host manager 130, the buffer manager 140, the flash controller 150, and peripheral interface 160 may be implemented in whole, or in part, using FPGA programmable logic (e.g., configurable logic blocks). For example, the various functionalities may operate in conjunction with physical connections such as PCIe, Ethernet, JTAG, I/O pins, etc. In various embodiments, the host manager 130, the buffer manager 140, and/or the flash manager 150 may be constructed using a register transfer level (RTL) design implemented on the FPGA 110. Thus, the functionality of each component may be modified by updating the RTL.

In various embodiments, the CPU subsystem 120 may include one or more processing cores. For example, the CPU subsystem 120 may utilize a plurality of Advanced RISC Machine (ARM) processing cores such as Cortex processing cores. However, in other embodiments, a different computing architecture may be employed. In various embodiments, the CPU subsystem may be configured to operate according to an embedded firmware stored on the NOR flash 180.

In various embodiments, the host manager 130 may be configured to provide a host with an interface for controlling the operation of the FPGA as well as access to the SSD 190. For example, in various embodiments, the host manager 130 may include a PCIe connection, an NVMe connection, Ethernet, and various types of FPGA programmable logic.

In various embodiments, the buffer manager 140 is configured to provide a buffer between the host manager 130 and the flash manager 150 for facilitating Input/Output requests. For example, in various embodiments the buffer manager 140 may include integrated SRAM as well as a DRAM controller coupled to the DRAM 170.

In various embodiments, the flash controller 150 is configured to manager the input/output of data to the flash 190 as well as perform various types of maintenance and other tasks. For example, in addition to performing I/O, the flash controller 150 may be configured to provide wear leveling, block picking, garbage collection, and encryption, provide a flash translation layer and mapping, etc. Thus, in various embodiments, the flash manager 150 may include a NAND manager, a flash pipeline control unit, and provide other SSD flash controller functionality. For example, the flash manager 150 may include an XOR engine, encryption, a randomizer, error correction, a toggle interface, etc. Each of these functional blocks may be specified by RTL and implemented using the FPGA 110. In various embodiments, the flash controller 150 may interface with the various groups of flash 192-198 using one or more channels.

In various embodiments, the FPGA SSD 100 may also be configured to for providing streamlined device management. For example, the FPGA SSD 100 may be configured to log environment information such as on-die temperature and voltages. For example, the temperature and voltages may be accessed by a memory map (via a sysmon module). The information may be accessed by a host via NVMe or NVMe-MI protocol via PCIe. In various embodiments, the FPGA SSD 100 may also be configured to allow for a streamlined firmware upgrade procedure which will be discussed further below with reference to FIGS. 3-5.

Figure 2:
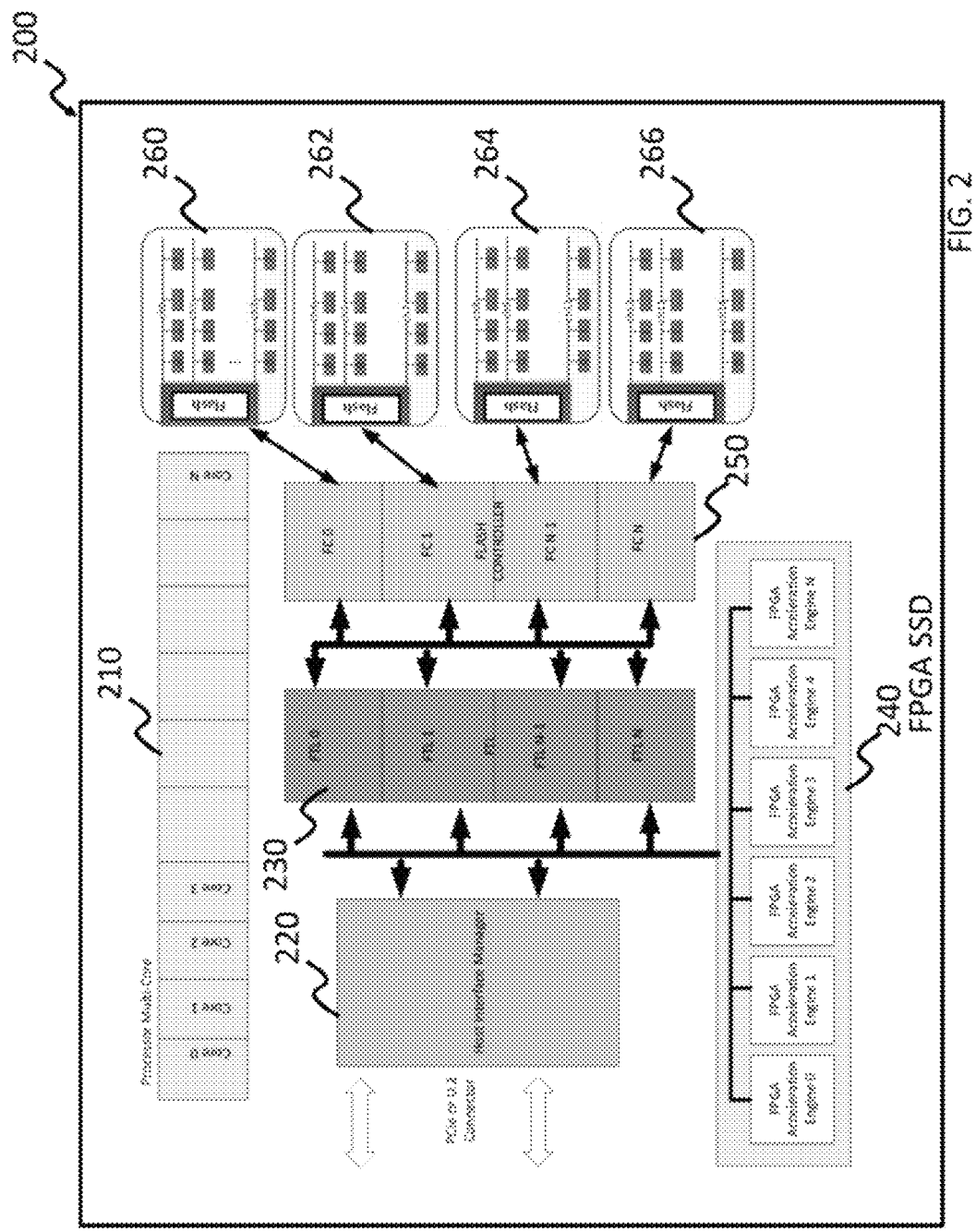
FIG. 2 depicts a functional block diagram of an integrated FPGA SSD based on multi-chip module technology according to various embodiments.

FIG. 2 depicts a functional block diagram of an integrated FPGA SSD based on multi-chip module technology according to various embodiments.

Referring to FIG. 2, in various embodiments, the FPGA SSD 200 may be integrated onto a single substrate using multi-chip module technology. For example, the FGPA SSD 200 may include a multicore processor 210, a host interface manager 220, a flash translation layer (FTL) 230, one or more FPGA acceleration engines 240, a flash controller 250, along with pluralities of flash chips 260-266. Each of the host interface manager 220, FTL 230, and flash controller 250 may be implemented on various logic blocks of the FPGA SSD 200 using RTL. Thus, modified RTL may be provided to update the functionality of each component.

Figure 3:
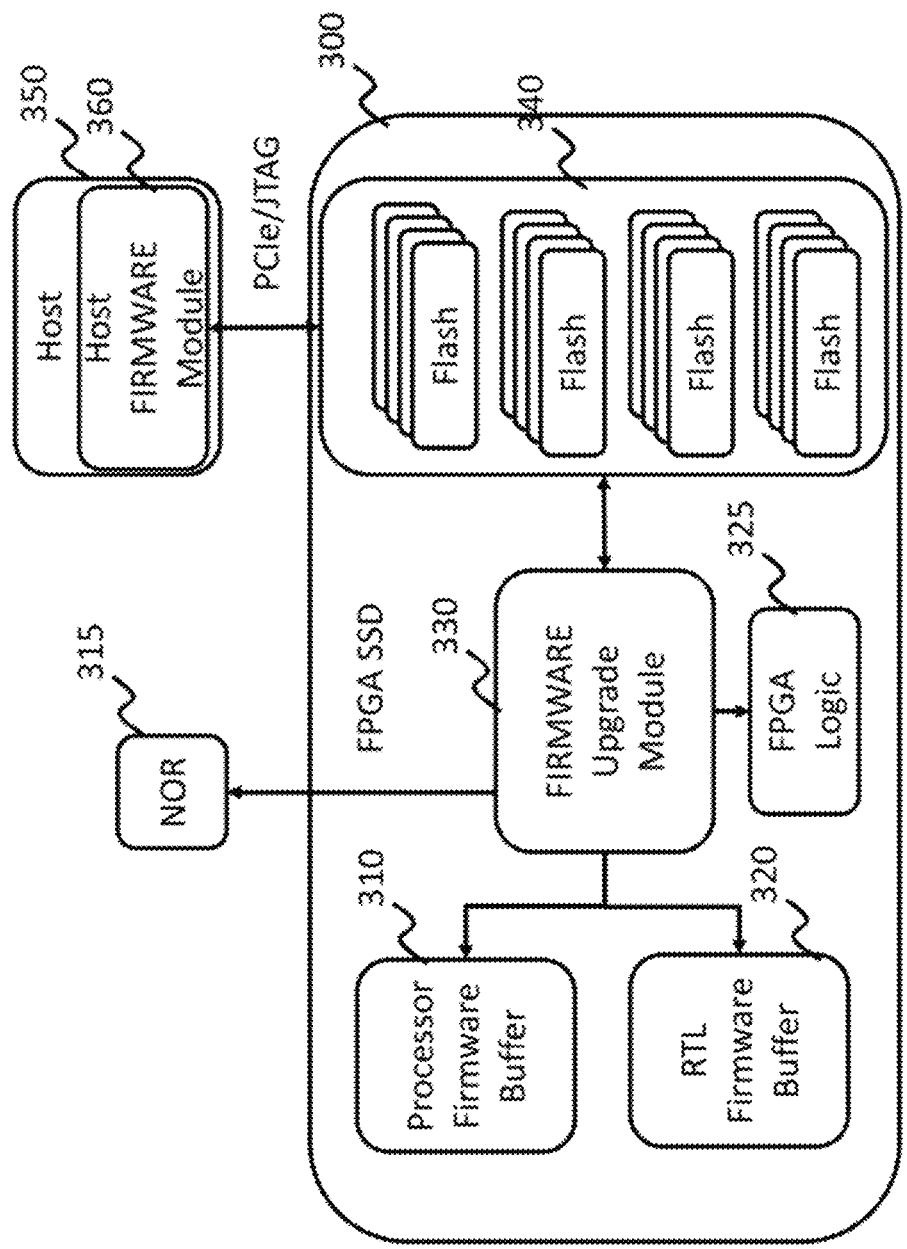
FIG. 3 depicts a function block diagram of a system for upgrading a SSD FPGA according to various embodiments.

FIG. 3 depicts a function block diagram of a system for upgrading a SSD FPGA according to various embodiments. Referring to FIG. 3, in various embodiments the FPGA SSD 300 may be configured for firmware upgrades. In various embodiments, the FPGA SSD 300 may operate using RTL firmware and FPGA processor firmware. In various embodiments, the RTL firmware may be configured to operate assorted FPGA-based functionality. For example, the RTL firmware may dictate the operation of the SSD controller. In various embodiments, the FPGA processor firmware may be configured to control the operation of the FPGAs multicore processor. In various embodiments the RTL firmware and the FPGA processor firmware are each stored in attached or integrated persistent memory. For example, the FPGA processor firmware may be stored in the attached NOR flash memory 315 and the RTL firmware may be flashed to the FPGA programmable logic 325. In various embodiments, the FPGA SSD 300 includes a firmware upgrade module 330 configured to facilitate the upgrading of the processor firmware and the RTL firmware. For example, in various embodiments an NVMe application operating on the host 350 (e.g., the host firmware module 360) may provide the FPGA SSD 300 with updated firmware using a PCIe or JTAG connection. In various embodiments, the host firmware module 360 may directly access the SSD memory 340 to store the new firmware images. In various embodiments, the SSD memory 340 is a non-volatile memory such as flash memory. However, in other embodiments, the SSD memory 340 may include any other type of non-volatile memory, such as phase change memory (PRAM), magnetoresistive RAM (MRAM), resistive RAM (RRAM), etc.

In various embodiments, the firmware upgrade module 330 may be configured to identify the new firmware packages stored in the SSD 340, unpack the contents, and temporarily store the images in a processor firmware buffer 310 and/or a RTL firmware buffer 320. The firmware upgrade module 330 may then write the new processor firmware to the NOR flash 315 and the new RTL firmware to the FPGA logic 325.

Figure 4:
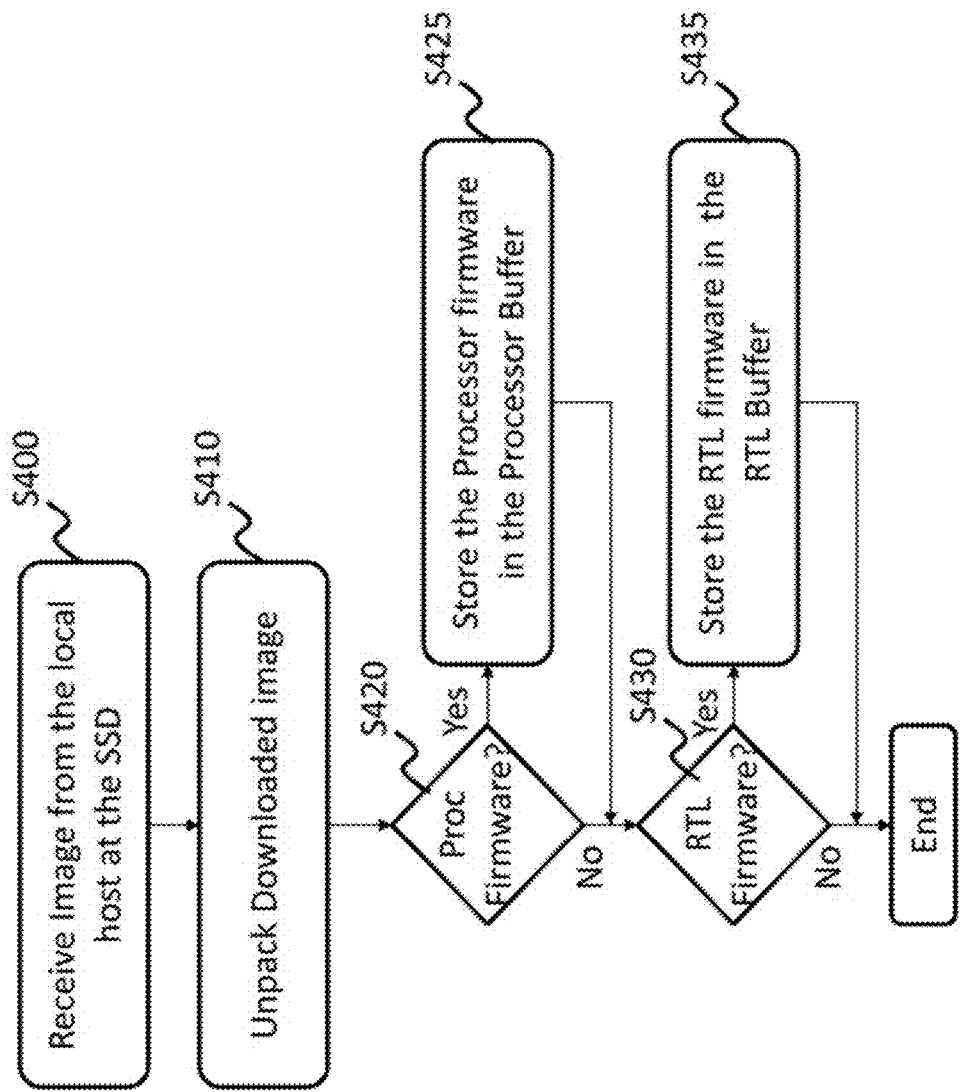
FIG. 4 depicts a method of downloading a FPGA SSD firmware upgrade according to various embodiments.

FIG. 4 depicts a method of downloading a FPGA SSD firmware upgrade according to various embodiments.

Referring to FIGS. 3 and 4, in various embodiments, the host firmware module 360 acquires (e.g., downloads from an external source) a new firmware image for the FPGA SSD 300. In various embodiments, the new firmware image may include new processor firmware and/or RTL firmware. The host firmware module 360 may then fragmentize and transfer the firmware image from the local host to the FPGA SSD 300 (S400). In various embodiments, the FPGA SSD may be configured for direct memory access. Thus, in some embodiments, the host firmware module 360 may directly access the SSD memory 340 using an NVMe or NVMe-MI protocol and PCIe. In other embodiments, the host firmware module 360 may directly access the SSD memory 340 using NVMe-oF in conjunction with an Ethernet connection. In some embodiments, the host 350 may be connected to the FPGA SSD 300 by a JTAG connection (e.g., at the factory). For example, the JTAG connection may be utilized to initialize a new FPGA SSD to create/erase flash partitions, and write to at least one of the partitions (e.g., for a fresh install of firmware to the FPGA SSD). In other embodiments, an I2C or SMBus interface may be utilized to connected to the FPGA SSD 300.

In various embodiments, once the new firmware has been stored on the FPGA SSD 300, the firmware upgrade module 330 is configured to identify the presence of the new firmware on the SSD 340 and unpack the packaged firmware (S410). Once the firmware has been unpackaged the file headers may be examined to determine the type of firmware upgrade. For example, the firmware upgrade module 330 may determine using the file header when the image includes embedded processor firmware (S420). If the image includes the embedded processor firmware, the firmware is saved to the processor firmware buffer 310 (S425). Similarly, the firmware upgrade module may determine if the image includes new RTL firmware (S430). When new RTL firmware is included, the RTL firmware may be stored the RTL buffer 320 (S435). The firmware upgrade module 330 may then facilitate the writing of the new firmware as will be discussed in detail with respect to FIG. 5.

Figure 5:
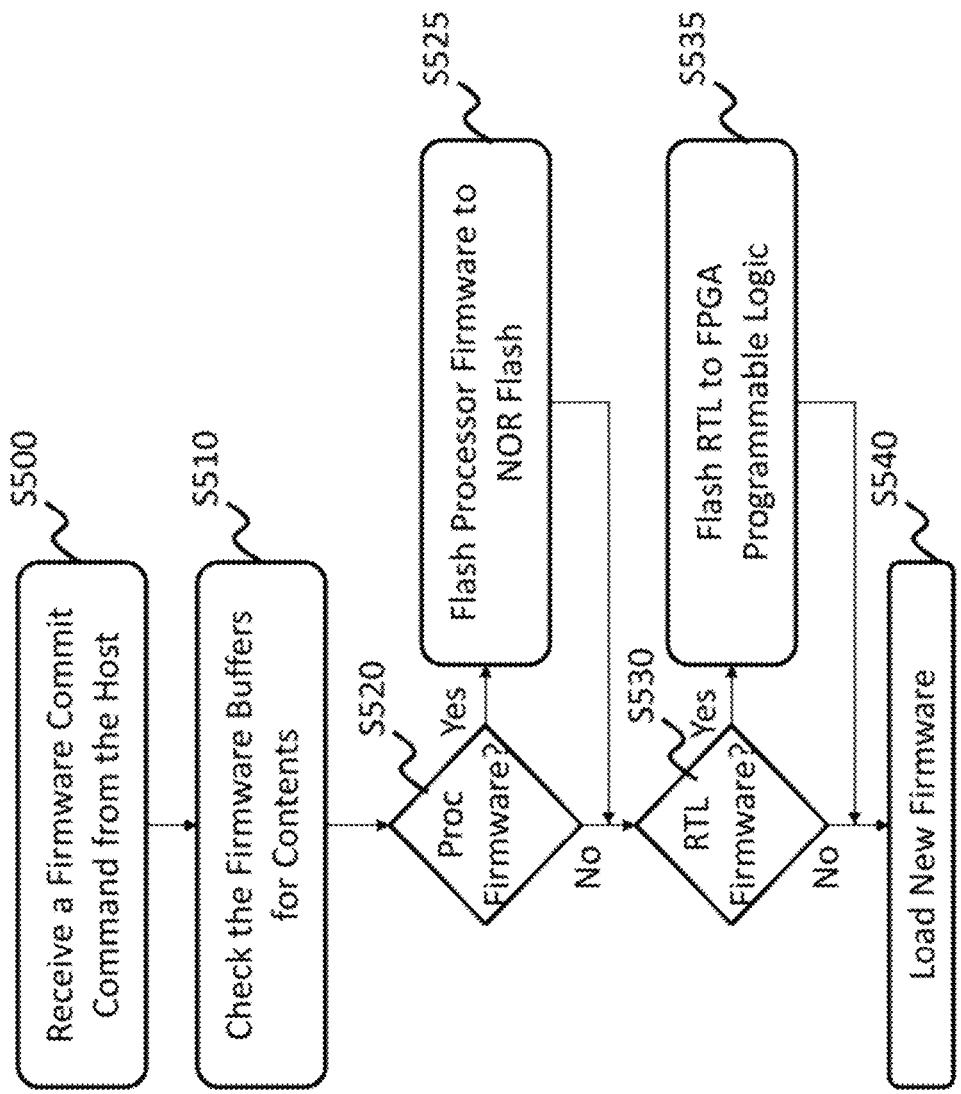
FIG. 5 depicts a method of installing FPGA SSD firmware according to various embodiments.

FIG. 5 depicts a method of installing FPGA SSD firmware according to various embodiments.

Referring to FIG. 5 and with continued reference to FIG. 3, in various embodiments, the firmware upgrade module 330 is configured to facilitate the installation of the received firmware upgrades. In various embodiments, the FPGA SSD 300 may receive, at the firmware upgrade module 330, a firmware commit command from the host firmware module 360 (S500). Upon receipt of the commit command, the firmware upgrade module 330 may check the firmware stored in the processor firmware buffer 310 and the RTL firmware buffer 320 (S510). For example, the firmware upgrade module checks the processor firmware buffer 310 for a processor firmware upgrade (S520) and when a processor firmware upgrade is present, the new processor firmware may be flashed to a partition on the NOR flash 315 (S525). For example, the firmware upgrade module 330 may utilize a MTD (Memory Technology Device) driver to write to the NOR flash 315. Similarly, the firmware upgrade module 330 also checks the RTL firmware buffer 320 for a RTL firmware upgrade (S530) and when a RTL firmware upgrade is present, the new RTL firmware may be flashed to the FPGA logic 315 (S535). Once the new firmware has been flashed, the new firmware may then be loaded (S540). For example, in some embodiments, the FPGA SSD 300 may be reset to load the new firmware.

Figure 6:
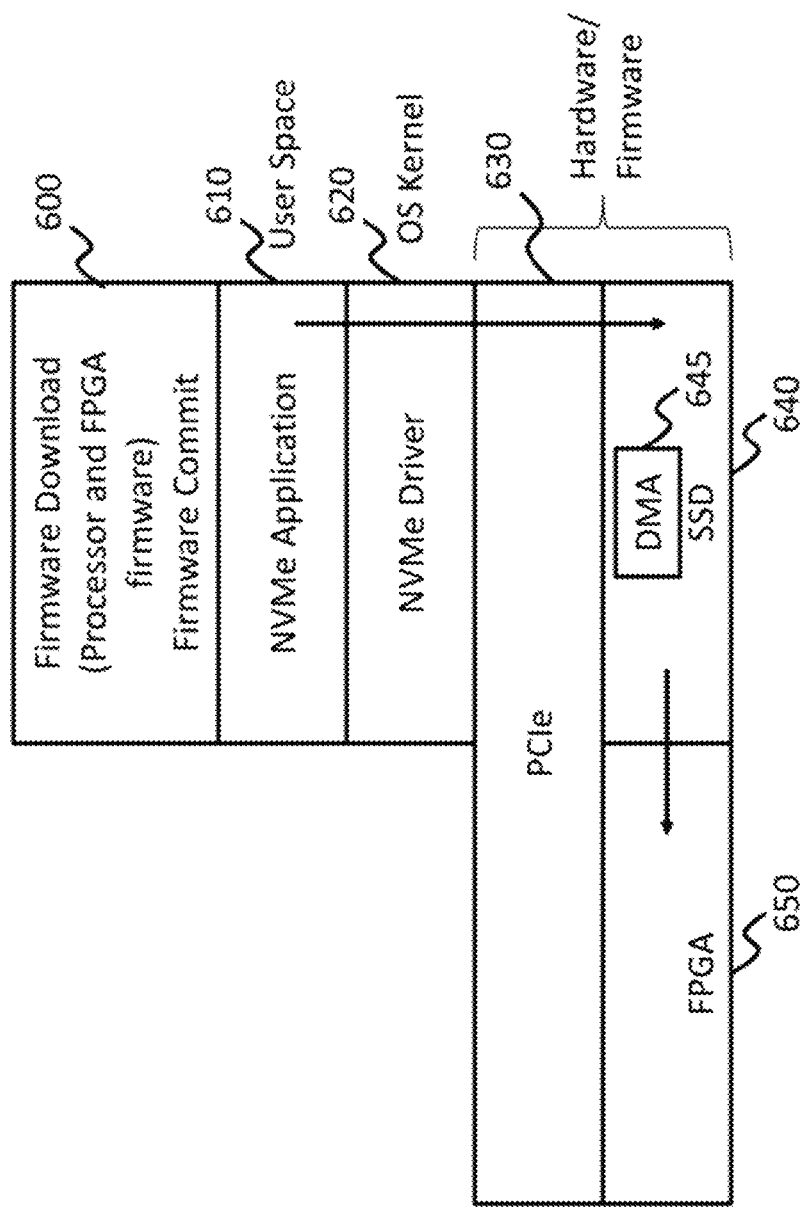
FIG. 6 depicts an example firmware upgrade path according to various embodiments.

FIG. 6 depicts an example firmware upgrade path according to various embodiment.

Referring to FIG. 6, in various embodiments, the firmware may be provided by an application to the FPGA SSD. For example, a firmware download or a firmware commit 600 may be initiated by a user or automatically by the NVMe application 610. For a firmware download, the NVMe application 610 may utilize the NVMe driver 620 to communicate with the SSD 640 using PCIe 630. In various embodiments, the NVMe application 610 may perform direct memory access (DMA) to the SSD 640 or a portion of the SSD 645. As discussed above with reference to FIGS. 3-5, the firmware is initially received at the SSD 640 and the firmware image may then be unpacked and transferred to the FPGA 650 where it is stored in the corresponding buffers (e.g., DMA 655). Similarly, the firmware commit command may be issued and be passed from the NVMe application 610 to FPGA 650 via the NVMe Driver 620 and PCIe 630.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of updating storage system comprising:
receiving, at a solid state disk (SSD) comprising flash chips and attached to a field programmable gate array (FPGA), a firmware image, the FPGA comprising a storage controller, the storage controller comprising a flash translation layer configured to interface with the SSD and to manage input of data from a host to the flash chips of the SSD and output of data from the flash chips of the SSD;
identifying, by a firmware upgrade module operating on the FPGA, a presence of the firmware image on the SSD;
storing, by the firmware upgrade module, the firmware image in a buffer on the FPGA; and
writing, by the firmware upgrade module, the firmware image to the FPGA,
wherein the firmware image comprises at least one of a processor firmware image and a register-transfer level (RTL) firmware image,
wherein the method further comprises:
determining, by the firmware upgrade module operating on the FPGA, that the firmware image comprises the processor firmware image,
wherein storing the firmware image comprises storing the processor firmware image in a processor firmware buffer of the FPGA,
wherein the method further comprises:
determining, by the firmware upgrade module operating on the FPGA, that the firmware image comprises a register-transfer level (RTL) firmware, and
wherein storing the firmware image further comprises storing the RTL firmware image in a RTL firmware buffer of the FPGA.

2. The method of claim 1, wherein writing, by the firmware upgrade module, the firmware image comprises flashing, by the firmware upgrade module, a processor firmware storage with the processor firmware image.

3. The method of claim 2, wherein the processor firmware storage comprises a NOR flash.

4. The method of claim 1, wherein writing, by the firmware upgrade module, the firmware image comprises flashing, by the firmware upgrade module, a programmable logic of the FPGA with the RTL firmware image.

5. The method of claim 1, wherein writing, by the firmware upgrade module, the firmware image, comprises receiving, from the host, a commit command.

6. A storage device comprising:
a solid state disk (SSD) comprising flash chips and configured to receive a firmware image;
a field programmable gate array (FPGA) configured to operate a storage controller comprising a flash translation layer configured to manage input from a host to the flash chips of the SSD and output of data from the flash chips of the SSD, wherein the FPGA includes a firmware upgrade module configured to:
identify a presence of the firmware image on the SSD; and
write the firmware image to the FPGA,
wherein the firmware upgrade module is further configured to:
determine that the firmware image includes a processor firmware image and store the processor firmware image in a processor firmware buffer of the FPGA; and
determine that the firmware image includes a register-transfer level (RTL) firmware image and store the RTL firmware image in a RTL firmware buffer of the FPGA.

7. The storage device of claim 6, wherein write firmware image comprises:
checking the processor firmware buffer for the processor firmware image and writing the contents of the processor firmware buffer when an updated processor firmware image is present; and
checking the RTL firmware buffer for the processor firmware image and writing the contents of the RTL firmware buffer when an updated processor firmware image is present.

8. The storage device of claim 7, wherein:
writing the contents of the processor firmware buffer comprises flashing the processor firmware image to a NOR flash; and
writing the contents of the RTL firmware buffer comprises flashing the RTL firmware to a FPGA programmable logic.

9. The storage device of claim 6, wherein the firmware upgrade module is further configured to receive a commit command from the host and write the at least one of the processor firmware image or the RTL firmware image according to the commit command.

10. The storage device of claim 6, wherein the SSD is configured to receive the firmware image directly from the host.

11. A method of updating storage system comprising:
receiving, at a solid state disk (SSD) comprising flash chips and attached to a field programmable gate array (FPGA), a firmware image comprising at least one of a processor firmware image and a register-transfer level (RTL) firmware image, the FPGA comprising a storage controller, the storage controller comprising a flash translation layer configured to interface with the SSD and to manage input of data from a host to the flash chips of the SSD and output of data from the flash chips of the SSD;
determining, by a firmware upgrade module operating on the FPGA, that the firmware image comprises the processor firmware image and storing the processor firmware image in a processor firmware buffer;
determining, by the firmware upgrade module operating on the FPGA, that the firmware image comprises a register-transfer level (RTL) firmware image and storing the RTL firmware image in a RTL firmware buffer;
flashing, by the firmware upgrade module, a processor firmware storage with the processor firmware image; and
flashing, by the firmware upgrade module, a programmable logic of the FPGA with the RTL firmware image.

12. The method of claim 11, further comprising unpacking the firmware image, by the firmware upgrade module operating on the FPGA.

13. The method of claim 12, wherein determining, by the firmware upgrade module operating on the FPGA, when the firmware image comprises the processor firmware image comprises:
examining, by the firmware upgrade module, a header of the unpacked firmware image to determine that the firmware image comprises the processor firmware image.

14. The method of claim 12, wherein determining, by the firmware upgrade module operating on the FPGA, when the firmware image comprises the RTL firmware image comprises:
examining, by the firmware upgrade module, a header of the unpacked firmware image to determine that the firmware image comprises the RTL firmware image.

15. The method of claim 12, further comprising receiving, from the host, a commit command to flash the firmware image.

* * * * *